Figure 1:
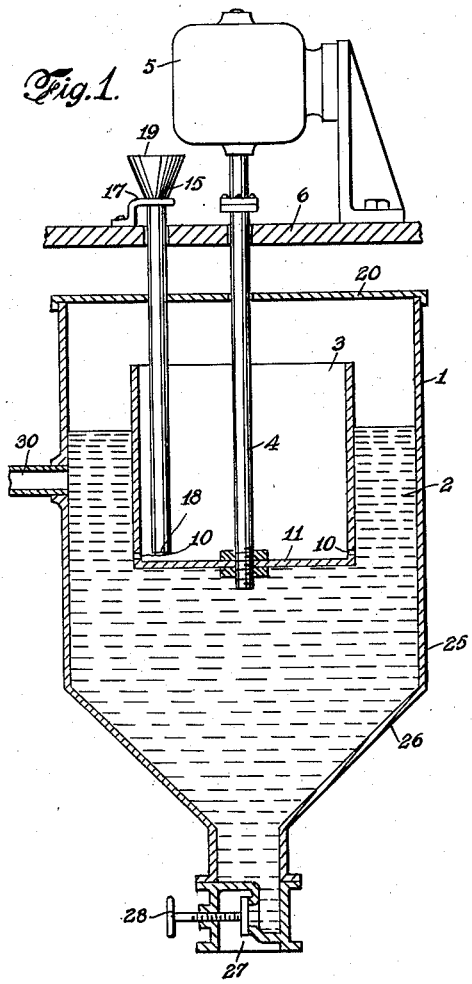

Oct. 27, 1942.  J. A. RAYNOLDS, JR  2,299,929
METHOD OF AND APPARATUS FOR PRODUCING SOLID BEADLETS
Filed July 9, 1940

INVENTOR.
JAMES ALBERT RAYNOLDS, JR.
BY
ATTORNEY.

Patented Oct. 27, 1942

2,299,929

UNITED STATES PATENT OFFICE 2,299,929

METHOD OF AND APPARATUS FOR PRODUCING SOLID BEADLETS

James Albert Raynolds, Jr., Great Neck, N. Y., assignor to The Atlantic Coast Fisheries Company, New York, N. Y., a corporation of Maine Application July 9, 1940, Serial No. 344,514

11 Claims. (Cl. 83—91)

This invention relates to a method of and apparatus for producing small solid spheroids formed of a composition containing a gelable colloid. More particularly, this invention relates to a method of and apparatus for producing a substantially dry vitamin preparation comprising spheroids formed of a gelable colloid, each spheroid containing discrete particles of a vitamin-bearing liquid dispersed therein and completely imprisioned and surrounded thereby, whereby no free vitamin-bearing liquid is on the exterior surface of said spheroids.

In accordance with the principles of the instant invention, an appropriate quantity of a gelable colloid is dissolved in warm water to produce an aqueous solution of the desired concentration. A predetermined quantity of a vitamin-bearing substance, such as an oil containing vitamin A or a vitamin A concentrate, is incorporated and emulsified in the aqueous gelatin solution, care being taken that when the vitamin-bearing liquid is dispersed therein the ultimate droplets or particles thereof will be materially smaller than the smallest size of the spheroids to be made, so that the vitamin-bearing liquid in the product will be dispersed and completely imprisoned and surrounded by the gelable colloid, whereby no free vitamin-bearing liquid is on the exterior surfaces of the product. As hereafter more fully explained, this gelable colloid vitamin-bearing liquid emulsion, while still at an elevated temperature, is sub-divided into small particles, and the particles simultaneously dispersed in an immiscible liquid wherein the liquid particles acquire a spherical form. At this stage of the process, and especially when the temperature of the immiscible liquid is insufficient to effect gelation of the liquid spheroids, the mass may be called a dual or polyphase emulsion, since it consists of an emulsion in which the immiscible liquid constitutes the continuous phase and the liquid spheroids (emulsion of vitamin-bearing liquid in the gelable colloid) constitute the dispersed phase. This duel or polyphase emulsion is appropriately treated, such as by being chilled, to convert or solidify the spheroids into firm gels sufficiently strong to permit handling. The mass is then appropriately treated to separate the solidified spheroids from the immiscible liquid. After the spheroids are appropriately dried to the desired degree, they may be classified as to size.

Alternatively, the gelable colloid vitamin-bearing liquid emulsion may be sub-divided and introduced into the immiscible liquid, as hereafter more fully explained, while the latter is maintained at a temperature sufficient to convert the gelable colloid vitamin-bearing oil emulsion into a firm gel (solid) sufficiently strong to permit handling thereof.

The solidified spheroids are separated from the immiscible liquid and dried by any of the procedures set forth in United States Patents Nos. 2,183,053 and 2,183,084. Thereafter, the solidified spheroids may, if necessary, be screened and classified according to size.

The procedure for sub-dividing the gelable colloid vitamin-bearing liquid emulsion constitutes an important feature of this invention. It is obtained according to this invention by extruding the emulsion containing the gelable colloid and vitamin-bearing liquid by centrifugal force through orifices submerged in a liquid which is immiscible with said gelable composition, whereby the extruded material is sub-divided into small particles which quickly assume spheroidal shapes.

In one form of the invention, the emulsion of gelable colloid and vitamin-bearing liquid is introduced, while maintained at an elevated temperature, into a cup having a plurality of spaced holes in its peripheral wall, said cup being partially immersed in the immiscible liquid whereby said holes are submerged therein. Means are provided to rotate the cup whereby the composition introduced therein will be extruded through said holes by centrifugal force. The immiscible liquid in which the cup is partially submerged and into which the composition is extruded effects a shearing action upon the composition as it is extruded through the holes, with the consequence that the shearing action sub-divides the extruded material into small particles which quickly assume spheroidal shapes.

The size of the final spheroids depends on the temperature and viscosity of the emulsion being extruded, the size of the holes through which the emulsion is extruded, the speed of rotation of the cup (centrifugal force), and the viscosity of the immiscible liquid.

As the gelable colloid, any colloid which can be converted from the liquid state to the gel, solid or semi-solid state can be used, and the expression "gelable" used in this specification and claims is intended to cover a substance which can be converted from a liquid to the gel, solid or semi-solid state. Though there are many gelable colloids which can be used in this invention, gelatin, for reasons which will become apparent, is preferred.

As the immiscible liquid which is to constitute the continuous phase of the dual or polyphase emulsion, any edible oil or fixed oil which is non-toxic, does not become rancid, and is immiscible with the constituents of the colloidal gel emulsion may be used. Mineral oil is the preferred immiscible liquid, though cotton seed oil, cocoanut oil, castor oil, soya bean oil, etc., may be used in place thereof or in admixture with each other.

As the vitamin-bearing liquid, high vitamin-potent oils, such as fish liver oils, etc. or concentrates thereof, natural or synthetic vitamins A or D or mixtures thereof dissolved in appropriate animal or vegetable oils or fats, may be used. The amount of potency of dispersed phase containing the vitamin A, vitamin D, or mixtures thereof, emulsified in the gelable colloid solution, is based on the vitamin potency desired in the finished product. It is to be understood, of course, that the proportion of vitamin-bearing composition to the gelable colloid must be low enough to be fully dispersed in the aqueous solution of the gelable colloid without becoming a continuous phase and without exuding in the final product.

If desired, coloring agents may be incorporated into the gelable colloid emulsion so as to produce colored products and/or to include wave lengths other than that excluded by the gelable colloid which constitutes the matrix in the final product.

If desired, other vitamins may be incorporated at any stage in the preparation of the emulsion from which the product is made. For example, vitamin E may be incorporated in the product by emulsifying wheat germ oil or its equivalent in the aqueous solution of the gelable colloid or by adding wheat germ oil or its equivalent to the fish liver oil or to the mixtures of vitamins A and D prior to the emulsification thereof in the aqueous solution of the gelable colloid.

If desired, a substance which, in addition to plasticizing the gelable colloid and inhibiting the deterioration of the vitamin upon exposure of the product to air, maintains the accessibility of the vitamins of the product to the digestive tract, may also be incorporated in the gelable colloid vitamin oil-bearing emulsion, as set forth in applications Serial Nos. 105,086 and 279,660 (now Patents Nos. 2,218,591 and 2,218,592, respectively).

Though in the preferred form of this invention the edible spherical product contains at least vitamin A and preferably also a substance to maintain the accessibility of the vitamins to the digestive tract, it is to be understood that the principles of this invention may be used to produce spheroids formed of a gelable colloid alone or spheroids formed of a gelable colloid containing discrete particles of other substances having medicinal or other desired properties and normally incompatible with the gelable colloid.

Figure 2:
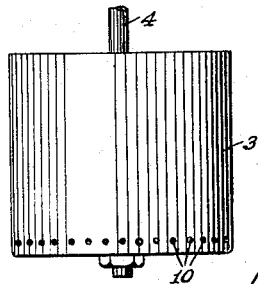

In order to more fully explain the nature of this invention, reference will be had to the accompanying drawing wherein:

Figure 1 is a vertical section of one embodiment of the apparatus constituting the instant invention; and Figure 2 is a front elevation of a detail of the apparatus shown in Figure 1.

Referring now to the drawing wherein like reference numerals designate like parts, the reference numeral 1 designates a vessel containing a liquid 2 which is to constitute the immiscible liquid previously described. A cup 3 is disposed in the vessel 1 so that said cup 3 is partially immersed in the immiscible liquid 2. The cup 3 is rigidly secured on one end of a vertical shaft 4. A motor 5 carried on a shelf 6 is operatively connected in driving relationship to the other end of the shaft 4. Thus, when the motor is energized, the shaft 4 will be rotated, with the consequence that the cup 3 will be rotated about its vertical axis.

The cup 3 is provided with a plurality of spaced holes or apertures 10 in its peripheral wall and preferably adjacent the bottom 11 thereof. In the preferred form, the holes 10 are arranged in a single row, as shown in Figure 2. The diameter of the holes may vary from $1/64$ to $1/16$ of an inch.

Means are provided to introduce the gelable colloid composition into the cup 3 and, in the form shown, this means comprises a funnel 15 which is carried by a bracket 17 on the shelf 6. The outlet end 18 of the funnel 15 is preferably positioned in the vicinity of the bottom 11 of the container 3 for reasons which will hereafter appear. If desired, the inlet end 19 of the funnel 15 may be appropriately connected to the source of supply of the emulsion. As is clearly shown in the drawing, the outlet 18 of the funnel 15 is considerably smaller in size relative to the cross-section of the container (cup) 3. Alternatively, the shaft 4 may be made hollow and provided with an outlet orifice adjacent the bottom of the cup 3 whereby the emulsion may be supplied to the cup 3.

Though the cup 3 shown in the drawing is in the shape of a cylinder, it is, however, to be understood that the shape of the cup is not restricted thereto. Any other shape may be used. The preferred shape is one wherein the inside diameter at the bottom is at least equal to or greater than the inside diameter at the top. Such shapes are preferred in order to prevent the composition introduced into the cup from spilling over the top of the cup during rotation thereof.

If desired, the vessel 1 may be provided with a lid 20 to close it at the top thereof.

The vessel 1 is preferably so constructed and designed that the dual or polyphase emulsion may be readily withdrawn therefrom for further treatment, as previously described. In the form illustrated, the vessel 1 is shown as having a cylindrical wall 25 provided at the lower end thereof with a downwardly converging wall 26 which communicates with the outlet 27, which may be controlled by a valve 28. An inlet 30 may be provided to supply the immiscible liquid 2 to the vessel 1. The inlet 30 is controlled by a valve not shown.

In operation, after the desired quantity of immiscible liquid 2 has been supplied to the vessel 1, the cup 3 is rotated by the shaft 4 driven by the motor 5. The warm solution of the gelable colloid is introduced through the funnel 15. Centrifugal force extrudes the solution of the gelable colloid through the holes 10, and the shearing action of the immiscible liquid 2 sub-divides the extruded material into small particles which quickly assume the spheroidal shape. In the continuous operation of the apparatus, the emulsion is continuously fed to the cup 3, and the resulting polyphase emulsion is withdrawn through the outlet 27 for further treatment, while immiscible liquid 2 is supplied through the inlet 30 to maintain the desired quantity thereof. When the apparatus is desired to be used intermittently, the polyphase emulsion is not withdrawn for further treatment until the desired quantity of emulsion has been emulsified in the immiscible liquid.

As previously mentioned, the size of the ultimate product depends largely upon the temperature and viscosity of the emulsion containing the gelable colloid, the speed of rotation of the cup, the size of the holes, and the viscosity of the immiscible liquid. By varying any one or more of these features, various sizes of product may be obtained. I have obtained spheroids having a size of 20 mesh and smaller by introducing a gelatin emulsion at a temperature of from 120° F. to 145° F. and containing 10% to 50% of gelatin into a cup 3 inches in diameter having 60 holes 1/32 of an inch in diameter, and rotating at 800 R. P. M. in soya bean oil.

Since it is obvious that various changes and modifications may be made in the above description without departing from the nature or spirit thereof, this invention is not restricted thereto except as set forth in the appended claims.

I claim:

1. An apparatus for producing solid spheroids of a composition containing a gelable colloid which comprises a vessel containing a liquid which is immiscible with said composition, a cup having a single row of spaced holes in its peripheral wall and partially immersed in said liquid whereby said holes are submerged therein, tubular means to introduce the composition containing the said gelable colloid in the liquid state into said cup, said tubular means extending into and terminating adjacent the bottom of said cup, the outlet of said tubular means being considerably smaller in size relative to the cross-section of said cup, and means to rotate said cup whereby the composition introduced therein will be extruded through said holes by centrifugal force and sheared by said immiscible liquid.

2. An apparatus for producing solid spheroids of a composition containing a gelable colloid which comprises a vessel containing a liquid which is immiscible with said composition, a vertical shaft, a cup mounted on said shaft, said cup having a single row of spaced holes in its peripheral wall and partially immersed in said liquid whereby said holes are submerged therein, tubular means to introduce the composition containing the said gelable colloid in the liquid state into said cup, said tubular means extending into and terminating adjacent the bottom of said cup, the outlet of said tubular means being considerably smaller in size relative to the cross-section of said cup, and means to drive said shaft whereby said cup will be rotated and the composition introduced therein will be extruded through said holes by centrifugal force and sheared by said immiscible liquid.

3. An apparatus for producing solid spheroids of a composition containing a gelable colloid which comprises a vessel containing a liquid which is immiscible with said composition, a cup having a single row of spaced holes in its peripheral wall adjacent the bottom thereof and partially immersed in said liquid whereby said holes are submerged therein, tubular means to introduce the composition containing the said gelable colloid in a liquid state into said cup, said tubular means extending into and terminating adjacent the bottom of said cup, the outlet of said tubular means being considerably smaller in size relative to the cross-section of said cup, and means to rotate said cup whereby the composition introduced therein will be extruded through said holes by centrifugal force and sheared by said immiscible liquid.

4. An apparatus for producing solid spheroids of a composition containing a gelable colloid which comprises a vessel containing a liquid which is immiscible with said composition, a cup having a single row of spaced holes in its peripheral wall adjacent the bottom thereof and partially immersed in said liquid whereby said holes are submerged therein, means to introduce the composition containing the said gelable colloid in the liquid state into said cup adjacent the bottom thereof, and means to rotate said cup whereby the composition introduced therein will be extruded through said holes by centrifugal force and sheared by said immiscible liquid.

5. An apparatus for producing solid spheroids of a composition containing a gelable colloid which comprises a vessel containing a liquid which is immiscible with said composition, a cup having a single row plurality of spaced holes in its peripheral wall and partially immersed in said liquid whereby said holes are submerged therein, the inside diameter of the cup adjacent the bottom thereof being greater than the inside diameter of the cup adjacent the top thereof, tubular means to introduce the composition containing the said gelable colloid in a liquid state into said cup, said tubular means extending into and terminating adjacent the bottom of said cup, the outlet of said tubular means being considerably smaller in size relative to the cross-section of said cup, and means to rotate said cup whereby the composition introduced therein will be extruded through said holes by centrifugal force and sheared by said immiscible liquid.

6. An apparatus for producing solid spheroids of a composition containing a gelable colloid of a composition containing a gelable colloid which comprises a vessel containing a liquid which is immiscible with said composition, a cup having a single row of spaced holes in its peripheral wall and partially immersed in said liquid whereby said holes are submerged therein, the inside diameter of the cup adjacent the bottom thereof being at least equal to the inside diameter of the cup adjacent the top thereof, means to introduce the composition containing the said gelable colloid in the liquid state into said cup, and means to rotate said cup whereby the composition introduced therein will be extruded through said holes by centrifugal force and sheared by said immiscible liquid.

7. In a method of producing solid spheroids, the steps which comprise extruding a liquid composition containing an edible gelable colloid by centrifugal force through orifices submerged in a non-toxic oil which is immiscible with said gelable composition, whereby the extruded material is sub-divided into liquid particles which assume spheroidal shapes, causing the liquid spheroidal particles to solidify, and separating the solidified spheroids from the oil.

8. In a method of producing solid spheroids, the steps which comprise extruding an edible gelatin composition at an elevated temperature by centrifugal force through orifices submerged in a non-toxic oil which is immiscible with said gelatin composition, whereby the extruded material is sub-divided into liquid particles which assume spheroidal shapes, causing the liquid spheroidal particles to solidify, and separating the solidified spheroids from the oil.

9. In a method of producing solid spheroids, the steps which comprise extruding an emulsion containing a vitamin-bearing substance containing at least vitamin A dispersed in a gelable colloid by centrifugal force through orifices submerged in a non-toxic oil which is immiscible with said emulsion, whereby the extruded material is subdivided into liquid particles which assume spheroidal shapes, causing the liquid spheroidal particles to solidify, and separating the solidified spheroids from the oil.

10. In a method of producing solid spheroids, the steps which comprise extruding an emulsion containing a vitamin-bearing substance containing at least vitamin A dispersed in gelatin by centrifugal force through orifices submerged in a non-toxic oil which is immiscible with said emulsion, whereby the extruded material is subdivided into liquid particles which assume spheroidal shapes, causing the liquid spheroidal particles to solidify, and separating the solidified spheroids from the oil.

11. An apparatus for producing solid spheroids of a composition containing a gelable colloid which comprises a vessel containing a liquid which is immiscible with said composition, a cup having a single row of spaced holes in its peripheral wall and partially immersed in said liquid whereby said holes are submerged therein, the inside diameter of the cup adjacent the bottom thereof being greater than the inside diameter of the cup adjacent the top thereof, means to introduce the composition containing the said gelable colloid in the liquid state into said cup, and means to rotate said cup whereby the composition introduced therein will be extruded through said holes by centrifugal force and sheared by said immiscible liquid.

JAMES ALBERT RAYNOLDS, Jr.

CERTIFICATE OF CORRECTION.

Patent No. 2,299,929.   October 27, 1942.

JAMES ALBERT RAYNOLDS, JR.

It is hereby certified that error appears in the printed specification of the above numbered patent requiring correction as follows: Page 2, first column, line 15, for "amount of" read --amount or--; page 3, second column, line 22, claim 5, strike out the word "plurality"; and that the said Letters Patent should be read with this correction therein that the same may conform to the record of the case in the Patent Office.

Signed and sealed this 1st day of December, A. D. 1942.

(Seal)

Henry Van Arsdale,
Acting Commissioner of Patents.